United States Patent
Gopinath

(10) Patent No.: US 12,556,765 B2
(45) Date of Patent: Feb. 17, 2026

(54) CONTENT ABRIDGEMENT

(71) Applicant: DISH Network Technologies India Private Limited, Bangalore (IN)

(72) Inventor: Bharani Vittal Gopinath, Banglore (IN)

(73) Assignee: DISH Network Technologies India Private Ltd., Bangalore (IN)

( * ) Notice: Subject to any disclaimer, the term of this patent is extended or adjusted under 35 U.S.C. 154(b) by 267 days.

(21) Appl. No.: 18/522,899

(22) Filed: Nov. 29, 2023

(65) Prior Publication Data

US 2025/0175675 A1    May 29, 2025

(51) Int. Cl.
| | |
|---|---|
| H04N 21/466 | (2011.01) |
| H04N 21/442 | (2011.01) |
| H04N 21/472 | (2011.01) |

(52) U.S. Cl.
CPC ... *H04N 21/4667* (2013.01); *H04N 21/44204* (2013.01); *H04N 21/472* (2013.01)

(58) Field of Classification Search
CPC ......... H04N 21/4667; H04N 21/44204; H04N 21/472
See application file for complete search history.

(56) References Cited

U.S. PATENT DOCUMENTS

| | | | | |
|---|---|---|---|---|
| 8,438,149 | B1 * | 5/2013 | Dicker | G06F 16/951 707/706 |
| 11,395,021 | B2 * | 7/2022 | Chundi | H04N 21/2407 |
| 12,354,036 | B2 * | 7/2025 | Pleiman | G06Q 10/02 |
| 2008/0155059 | A1 * | 6/2008 | Hardin | H04N 21/816 709/218 |
| 2024/0305846 | A1 * | 9/2024 | Frederickson | H04N 21/266 |
| 2025/0053886 | A1 * | 2/2025 | Pleiman | G06Q 10/02 |

* cited by examiner

*Primary Examiner* — Nathan J Flynn
*Assistant Examiner* — Christine A Kurien
(74) *Attorney, Agent, or Firm* — Wash Park IP Ltd.; John T Kennedy

(57) ABSTRACT

A user device instantiates a content-activity monitoring application ("CAMA") which monitors a user interface to detect the user content activity with respect to the given content; determines a first content portion of the given content corresponding with the detection of the user content activity; determines a content characteristic of the first content portion of the given content; and generates user content activity data that identifies the user content activity and the first content portion of the given content. A STB instantiates an abridgement engine which receives the user content activity data generated by the CAMA and generates user content relationship data based on a correspondence of the user content activity with the content characteristic of the first content portion of the given content. Based on the user content relationship data, the STB generates a condensed content data set for output to the user device and presentation to the given user.

20 Claims, 5 Drawing Sheets

CONTENT ABRIDGEMENT

TECHNICAL FIELD

The technology described herein generally relates to devices, systems, and processes for facilitating abridgement of content of interest to a given user based upon user viewing activities.

BACKGROUND

User of electronic devices commonly consume content (by watching, listening, or otherwise) from one or more performers, teams, actors, directors, or the like on a repeat basis. As used herein, content is "consumed" by the presentation thereof to a user in a user perceptible format (e.g., as audio, video, motion, or otherwise) and by one or more corresponding content presentation device(s) (e.g., sounds systems, televisions, electronic displays, or the like). For example, a user may be a fan of or otherwise like (or dislike) a given musical group, musician, sporting team, sports star, public speaker, actor, comedian, or otherwise (herein, individually and collectively "artist(s)") commonly will consume content performed by such artist(s) on a repetitive basis. A user may also commonly consumer content that corresponds to one or more genres, topics, or the like. For example, a user may prefer to consume comedic content, while not preferring to consume romance content. Similarly, a user may prefer to consume content on topics relating to sports while not consuming content regarding topics relating to world affairs, or the like (herein such content individually and collectively being "user preferred content").

While a given user may desire to consume content user preferred content, a user may not have the time or inclination to consume many if not most of the multiple instances of such user preferred content. For example, a user preference for a comedian, such as Jerry Seinfeld, may not commonly equate to a user availability or proclivity to consume all content produced by Jerry Seinfeld. Yet, the user may prefer to consume highly regarded instance of the artist's content, new instances of the artist's content, updates regarding a given preferred genre or topic of interest, or the like.

Similarly, even when a user may have time to consume some of the artist's content or the like, the user may not be aware of when such content is or was available or know how to access such content.

Accordingly, devices, systems and processes are needed which facilitate user access to user preferred content while considering a given user's time available to view the preferred content and access to such preferred content (e.g., the devices, streaming services, or the like available to the user).

SUMMARY

Various implementations are described of devices, systems, and processes for facilitating abridgement of one or more instances of content.

In accordance with at least one implementation of the present disclosure, a system of one or more computers can be configured to perform particular operations or actions by virtue of having software, firmware, hardware, or a combination thereof installed on the system that, in operation, cause(s) the system to perform the actions. One or more computer programs can be configured to perform particular operations or actions by virtue of including instructions that, when executed by a data processing apparatus, cause the apparatus to perform the actions.

For at least one implementation, a system may include a user device and a set top box ("STB"), coupled to the user device, the user device may include: a non-transient user device data store storing first computer instructions, which when executed, instantiate a content-activity monitoring application ("CAMA"); a user interface coupled to a user interface presenting a given content to a given user and receiving user content activity; and a user device processor coupled to the user device data store and the user interface. For at least one implementation, the user device processor, when executing the first computer instructions, instantiates the CAMA, which performs first operations that may include one or more of: monitoring the user interface to detect the user content activity with respect to the given content; determining a first content portion of the given content that corresponds with the detection of the user content activity; and determining a content characteristic of the first content portion of the given content; and generating user content activity data that identifies the user content activity and the first content portion of the given content. For at least one implementation, the set top box may include a non-transient STB data store storing second computer instructions for an abridgement engine and an STB processor coupled to the STB data store. The STB processor, when executing the second computer instructions, instantiates the abridgement engine which performs second operations including one or more of: receiving the user content activity data generated by the CAMA and generating user content relationship data based on a correspondence of the user content activity with the content characteristic of the first content portion of the given content. For at least one implementation and based on the user content relationship data, the STB processor generates a condensed content data set for output to the user device and presentation to the given user.

For at least one implementation of the system one or more of the following conditions may apply: the STB data store further store third computer instructions for a user preference engine; the STB processor, when executing the third computer instructions, instantiates the user preference engine. For at least one implementation, the user preference engine may perform one or more third operations that include: analyzing the user content relationship data to identify one more user content preferences for the given user; analyzing one or more user preferences stored in the STB data store; and generating, based on the user content relationship data and the one or more user preferences, user content preference data.

For at least one implementation of the system one or more of the following conditions may apply: the STB data store may further store fourth computer instructions for a content search engine; the STB processor, and, when executing the fourth computer instructions, instantiates the content search engine. For at least one implementation, the content search engine may perform one or more fourth operations including: searching at least one content source for portions of content which correspond to the user content preference data; and generating, based on results obtained from the searching, the condensed content data set.

For at least one implementation of the system one or more of the following conditions may apply: the user content activity includes a trick-play operation requested by the given user with respect to the first content portion of the given content.

For at least one implementation of the system one or more of the following conditions may apply: the first operations performed by the CAMA further include identifying the content characteristic of the first portion of the given content and populating the user content activity data with the content characteristic of the first portion of the given content.

For at least one implementation of the system one or more of the following conditions may apply: the content characteristics of the first content may be identified based on metadata associated with the given content.

For at least one implementation of the system one or more of the following conditions may apply: the identifying of the content characteristic of the first content may further include executing Artificial Intelligence/Machine Learning ("AI/ML") processes to identify the content characteristic of the first portion of the given content. For at least one implementation the AI/ML processes may be executed using a neural network coupled to the user device and the AI/ML processes may further include performing at least one of facial recognition, voice recognition and textual recognition on the first portion of the given content.

For at least one implementation of the system one or more of the following conditions may apply: the first operations may further include: further monitoring the user interface to detect a next user content activity with respect to numerous instances of a next given content; further determining a next content portion of one or more of the numerous instances of the next given content that corresponds with the detection of the next user content activity; populating the user content activity data with data that identifies, for the one or more of the numerous instances of the next given content, the next user content activity and the next content portion; and repeatedly performing the further monitoring, the further determining and the populating with respect to the one or more of the numerous instance of the next given content presented to the given user over one or more given periods.

For at least one implementation of the system one or more of the following conditions may apply: the first operations performed by the CAMA further include, with respect to at least one of the one or more of the numerous instances of the next given content: further identifying the content characteristic of the first portion of the next given content and populating the user content activity data with the content characteristic of the first portion of the next given content.

For at least one implementation of the system, the further identifying of the content characteristic of the next given content, with respect to at least one of the one or more of the numerous instances of the next given content, may further include executing the AI/ML processes to perform at least one of facial recognition, voice recognition and textual recognition on the one or more of the numerous instances of the first portion of the next given content.

For at least one implementation of the system, the second operations may be performed by the abridgement engine with respect to the at least one of the one or more numerous instances of the next given content.

For at least one implementation of the system, second AI/ML processes may be utilized to refine the user content relationship data based on at least one of numerous correspondences of the one or more numerous instances of next user activity with the at least one or more of the numerous instances of the next given content.

For at least one implementation of the system one or more of the following conditions may apply: the second AI/ML processes may be applied to at least ten instances of next user activity that correspond to at least ten instances of the next given content.

For at least one implementation of the system, the second AI/ML processes may discern a user content viewing habit and the second operations may further include populating the user content preference data based on the user content viewing habit.

For at least one implementation of the system, the fourth operations may further include: second searching at least one content source for portions of content which further correspond to user preference data for the given user; and generating, based on results obtained from the searching and second searching, the condensed content data set. For at least one implementation, the user preference data may indicate at least one of how, when and where a given user prefers to receive content.

For at least one implementation of the present disclosure, a non-transitory computer readable medium, having stored thereon computer instructions which, when executed by a processor of a user device, causes the user device to perform one or more operations including: monitoring a user-to-device interface to detect user content activity with respect to a given content presented to a given user of the user device; determining a first content portion of the given content that corresponds with the detection of the user content activity; determining a content characteristic of the first content portion of the given content; executing at least one Artificial Intelligence/Machine Learning ("AI/ML") process to further identify the content characteristic of the first portion of the given content; generating user content activity data that identifies the user content activity and the first content portion of the given content; further monitoring the user interface to detect a next user content activity with respect to numerous instances of a next given content; further determining a next content portion of one or more of the numerous instances of the next given content that corresponds with the detection of the next user content activity; populating the user content activity data with data that identifies, for the one or more of the numerous instances of the next given content, the next user content activity and the next content portion; performing the further monitoring, the further determining and the populating with respect to the one or more of the numerous instance of the next given content presented to the given user over one or more given periods to generate a user content activity data set; and providing the user content activity data set to a server. For at least one implementation and based on the user content activity data set, the server may generate and provide a condensed content data set to the user device for presentation to the given user.

For at least one implementation of the present disclosure, a non-transitory computer readable medium, having stored thereon computer instructions which, when executed by a processor of a set top box ("STB"), cause the STB to perform one or more operations including: instantiating an abridgement engine. For at least one implementation, the abridgement engine may perform operation including: receiving user content activity data generated by a content activity monitoring application instantiated on a user device; generating user content relationship data based on a correspondence of the user content activity with a content characteristic of a first content portion of a given content presented to a given user of the user device; and generating, based on the user content relationship data, a condensed content data set for output to the user device and presentation to the given user.

For at least one implementation of the non-transitory computer readable medium, the operations may further include one or more of: analyzing the user content relationship data to identify one more user content preferences for the given user; analyzing one or more user preferences stored in an STB data store; and generating, based on the user content relationship data and the one or more user preferences, user content preference data for the given user.

For at least one implementation of the non-transitory computer readable medium, the operations may further include one or more of: searching at least one content source for portions of content which correspond to the user content preference data for the given user; and generating, based on results obtained from the searching, the condensed content data set.

BRIEF DESCRIPTION OF THE DRAWINGS

The features, aspects, advantages, functions, modules, and components of the devices, systems, and processes provided by the various implementations of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference label irrespective of any additional alphabetic designators or second reference labels, if any.

DETAILED DESCRIPTION

Figure 1:
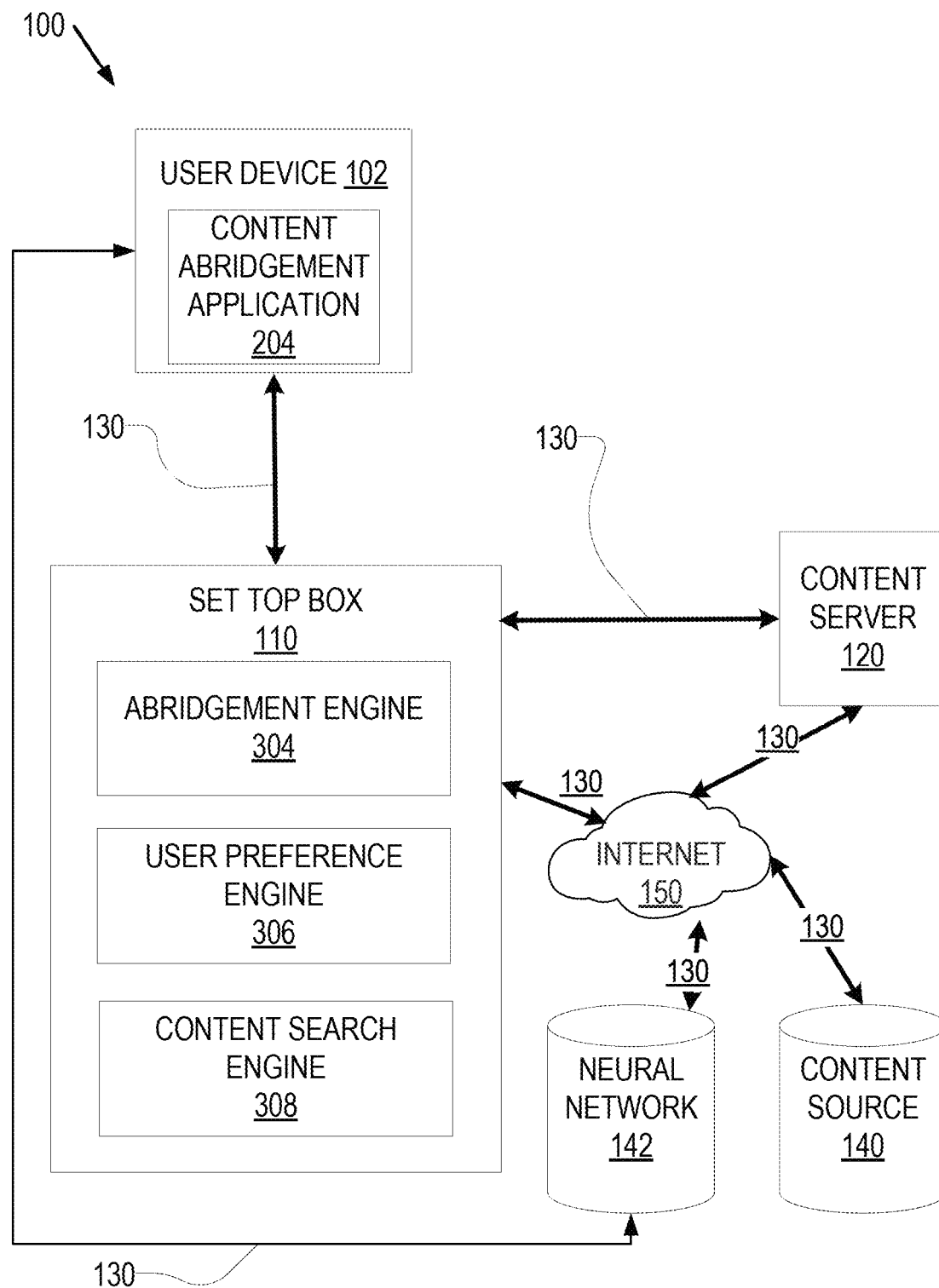
FIG. 1 is a schematic illustration of an implementation of a content abridgement system and in accordance with at least one implementation of the present disclosure.

Various implementations of the present disclosure describe devices, systems, and processes for abridging content for presentation to a user based on at least one of a user preference, user content viewing history, and/or a user activity history.

"Acceptable delay" is a delay of less than a given metric, for example and not by limitation, four seconds (4 s) under normal system load conditions and thirty seconds (30 s) under heavy system load conditions. An acceptable delay may vary based on current system load conditions.

"Additional I/O interface" (AIOI) herein refers to one or more components, provided with or coupled to a device, configured to support a receiving and/or presenting of additional inputs and outputs to and from one or more users. An AIOI may be configured to support the receiving and presenting of the additional I/O content (AIO) to users. Herein, the AIO, as communicated, may be referred to as "AIO signals." An AIO signal may include an audible signal or a visible signal and may be communicated separately or collectively therewith. An AIOI may include any interface not otherwise categorized as an Audio I/O interface or a Visual I/O interface with non-limiting examples including touch pads, keyboards, sensors, motion detectors, tactile elements, and the like. Any known or later arising technologies configured to convey information to or from one or more users as an AIO signal may be utilized for at least one implementation of the present disclosure. An AIOI includes hardware and computer instructions (herein, "AIO technologies") which supports the input and output of other signals with a user.

"AI/ML" (Artificial Intelligence/Machine Learning) herein refers to the use of one or more supervised learning, unsupervised learning, and/or refinement learning processes (as executed by one or more processors which may include processors associated with one or more neural networks) to determine one or more of the following: identifying user content relationship based upon user activities vis-à-vis multiple instances of content; identifying based on the user content relationships identified, one or more user preferences (likes, dislikes and neutral) with respect to content and/or content characteristics (as described below); searching, based on the identified user preference(s), content sources, content databases, content libraries, and portions of such content for one or more content portions to present to the given user (such content may include content previously presented and content not previously presented to the given user) in a condensed content data set; and providing to a user device, for presentation to a given user, the condensed content data set. For at least one implementation, AI/ML also refers to the use of refinement learning where user feedback is received in response to prior instances of content identified for presentation to the user and analyzed to further refine a model that associates user content preferences with user content activities.

"Application" herein refers to a set of computer instructions that configure one or more processors to perform one or more tasks that are other than tasks commonly associated with the operation of the processor itself (e.g., a "system software," an example being an operating system software), or the providing of one or more utilities provided by a device (e.g., a "utility software," an example being a print utility). An application may be bundled with a given device or published separately. Non-limiting examples of applications include word processing applications (e.g., Microsoft WORD™), video streaming applications (e.g., SLINGTV™), video conferencing applications (e.g., ZOOM™), gaming applications (e.g., FORTNITE™), and the like.

"Audio I/O interface" herein refers to one or more components, provided with or coupled to an electronic device, configured to support a receiving and/or presenting of humanly perceptible audible content to one or more users. Such audible content (which is also referred to herein as being "audible signals") may include spoken text, sounds, or any other audible information. Such audible signals may include one or more humanly perceptible audio signals, where humanly perceptible audio signals typically arise between 20 Hz and 20 KHz. The range of humanly perceptible audio signals may be configurable to support an audible range of a given individual user. An audio I/O interface includes hardware and computer instructions (herein, "audio technologies") which supports the input and output of audible signals to a user. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise. An audio I/O interface may use one or more microphones and speakers to capture and present audible signals respectively from and to a user. Such one or more microphones and speakers may be provided by a given device itself or by a device communicatively couple additional audible device component. For example, earbuds may be communicatively coupled to a smartphone, with the earbuds functioning as an audio I/O interface and capturing and presenting audio signals as sound waves to and from a user, while the smartphone functions as a UD. An audio I/O interface may be configured to automatically recognize, and capture comments spoken by a user and intended as audible signals for sharing with other users, inputting commands, or otherwise.

"Bus" herein refers to any known and/or later arising technologies which facilitate the transfer of data within and/or between components of a device. Non-limiting examples include Universal Serial Bus (USB), PCI-Express, Compute Express Link (CXL), IEEE-488 bus, High Performance Parallel Interface (HIPPI), and the like.

"Cloud" herein refers to cloud computing, cloud storage, cloud communications, and/or other technology resources which a given user does not actively manage or provide. A usage of a Cloud resource may be private (limited to various users and/or uses), public (available for multiple users and/or uses), hybrid, dedicated, non-dedicated, or otherwise. It is to be appreciated that implementations of the present disclosure may use Cloud resources to provide for processing, storage and other functions related to facilitating AET functions. An implementation may utilize Cloud resources using any known or later arising data delivery, processing, storage, virtualization, or otherwise technologies, standards, protocols (e.g., the Simple Object Access Protocol (SOAP), the Hyper Text Transfer Protocol (HTTP), Representational State Transfer protocol (REST), or the like. Non-limiting examples of such technologies include Software as a Service (SaaS), Platform as a Service (Paas), Infrastructure as a Service (Iaas), and the like. Cloud resources may be provided by one or more entities, such as AMAZON WEB SERVICES provided by Amazon.com Inc., AZURE provided by Microsoft Corp., and others.

"Component" herein refers to a Module of a Device, as further defined herein.

"Computer Data" herein refers to Data, as further defined herein.

"Computer engine" (or "engine") herein refers to a combination of a processor and computer instruction(s). A computer engine executes computer instructions to perform one or more logical operations (herein, a "logic") which facilitate various actual (non-logical) and tangible features and function provided by a system, a device, and/or combinations thereof.

"Computer instruction" herein refers to an Instruction, as further defined herein.

"Communications Interface" herein refers to one or more separately provided components and/or integrated with other components of a Device that is configured to facilitate communication of data with one or more other devices using a Coupling. Non-limiting examples of communications interfaces including networking cards, Wi-Fi™ modules, Ethernet ports, Bluetooth radio modules, wireless radio modules, and the like. Any known or later arising components, technologies, protocols, communications mediums, or the like may be used as a communications interface in a given device in an ETS.

"Content" herein refers to data that that may be presented, using a suitable presentation device, to a user in a humanly perceptible format. When presented to a human, the data becomes "information." Non-limiting examples of content include images and graphics such as those related to television programs, streaming video, music, or otherwise. Content may include, for example and not by limitation, one or more sounds, images, video, graphics, gestures, or otherwise. The content may originate from any source, including live and/or recorded, augmented reality, virtual reality, computer generated, or otherwise. The content may be presented to a given user using any user device and any user interface. Content may be stored, processed, communicated, or otherwise utilized. Content may identify artists, events, venues or the like.

"Content Characteristic" herein refers to data, which may include metadata, which identifies one or more attributes, features, qualities, properties, traits, aspects, elements, facets, styles, tone, members, performers, specialties, directors, or the like for a given content. For a non-limiting example, a content characteristic may identify a given content as being performed by a given entity, such as a college football game being performed by a given college or university. For another non-limiting example, a content characteristic may identify a given person as performing in a given content, such as an actor performing in a movie, a singer performing a song, or otherwise.

"Coupling" herein refers to the establishment of a communications link between two or more elements of a given system. A coupling may utilize any known and/or later arising communications and/or networking technologies, standards, protocols or otherwise. Non-limiting examples of such technologies include packet switch and circuit switched communications technologies, with non-limiting examples including, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, IoT networks, Cloud based networks, private networks, public networks, or otherwise. One or more communications and networking standards and/or protocols may be used, with non-limiting examples including, the TCP/IP suite of protocols, ATM (Asynchronous Transfer Mode), the Extensible Message and Presence Protocol (XMPP), Voice Over IP (VOIP), Ethernet, Wi-Fi, CDMA, Z-WAVE, Near Field Communications (NFC), GSM/GRPS, TDMA/EDGE, EV/DO, WiMAX, SDR, LTE, MPEG, BLUETOOTH, and others. A coupling may include use of physical data processing and communication components. A coupling may be physically and/or virtually instantiated. Non-limiting examples of physical network components include data processing and communications components including computer servers, blade servers, switches, routers, encryption components, decryption components, and other data security components, data storage and warehousing components, and otherwise. Any known or later arising physical and/or virtual data processing and/or communications components may be utilized for a given coupling.

"Data" herein refers to any representation of facts, information or concepts in a form suitable for processing, storage, communication, or the like by one or more electronic device processors, data stores, routers, gateways, or other data processing and/or communications devices and systems. Data, while and/or upon being processed, may cause or result in an electronic device or other device to perform at least one function, task, operation, provide a result, or otherwise. Data may be communicated, processed, stored and/or otherwise exist in a transient and/or non-transient form, as determined by any given state of such data, at any given time. For a non-limiting example, a given data packet may be non-transient while stored in a storage device, but transient during communication of the given data packet from a first device or system to a second (or more) device or system. When received and stored in one or more of a cache, a memory, a data storage device, or otherwise, the given data packet has a non-transient state. For example, and not by limitation, data may take any form including as one or more applications, content, or otherwise. Instructions, as further described herein, are a form of data.

"Data store" herein refers to any non-transient device, combinations of devices, component of a device, combinations of components of one or more devices, or the like configured to store data on a temporary, permanent, non-transient, or other basis. A data store is also referred to herein as a "computer readable medium" and/or a "non-transitory computer readable medium." A data store may store data in any form, such as electrically, magnetically, physically, optically, or otherwise. A data store may include a cache on a processor, memory devices, with non-limiting examples including random access memory (RAM) and read only memory (ROM) devices, and the like. A data store may include one more storage devices, with non-limiting examples including electrical storage drives such as EEPROMs, Flash drives, Compact Flash (CF), Secure Digital (SD) cards, Universal Serial Bus (USB) cards, and solid-state drives, optical storage drives such as DVDs and CDs, magnetic storage drives such as hard drive discs, magnetic drives, magnetic tapes, memory cards, and others. Any known or later arising data storage device technologies may be utilized for a given data store. Available storage provided by a given one or more data stores may be partitioned or otherwise designated by a storage controller as providing for permanent storage and temporary storage. Non-transient data, computer instructions, or other the like may be suitably stored in a data store permanently or temporarily. As used herein, permanent storage is distinguished from temporary storage, with the latter providing a location for temporarily storing data, variables, or other instructions used for a then arising or soon to arise data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store data which, while communicated may be transient or non-transient, but while stored, is defined herein to be a form of non-transient data.

"Device" and "electronic device" herein refer to any known or later arising electrical device configured to, singularly and/or in combination, communicate, manipulate, output (e.g., for presentation as information to a human), process, store, or otherwise utilize data. Non-limiting examples of devices include User Devices, Set Top Boxes, and Content Servers.

"Instruction" herein refers to a non-transient processor executable instruction, associated data structures, sequence of operations, program modules, or the like. An instruction is described by an instruction set. It is commonly appreciated that instruction sets are often processor specific and accordingly an instruction may be executed by a processor in a language format (e.g., a machine language format) that is translated from a higher level programming language (e.g., C++). An instruction may be provided using any form of known or later arising programming; non-limiting examples including declarative programming, imperative programming, functional programming, procedural programming, stack based programming, object-oriented programming, and otherwise. An instruction may be performed by using data and/or content stored in a data store on a transient and/or non-transient basis, as may arise for any given data, content and/or instruction.

"Module" herein refers to and, when claimed, recites definite structure for a device that is configured to provide at least one feature and/or output signal and/or perform at least one function including one or more of the features, output signals and functions described herein. A module may provide the one or more functions using computer engines, processors, computer instructions, and the like. When a feature, output signal and/or function is provided, in whole or in part, using a processor, one more software components may be used, and a given module may include a processor configured to execute computer instructions. A person having ordinary skill in the art (a "PHOSITA") will appreciate that the specific hardware and/or computer instructions used for a given implementation will depend upon the functions to be accomplished by a given module. Likewise, a POSITA will appreciate that such computer instructions may be provided in firmware, as embedded software, provided in a remote and/or local data store, accessed from other sources on an as-needed basis, or otherwise. Any known or later arising technologies may be used to provide a given module and the features and functions supported therein.

"Power Supply/Power" herein refers to any known or later arising technologies which facilitate the providing to and/or use by a device of electrical power. Non-limiting examples of such technologies include batteries, power converters, inductive charging components, line-power components, solar power components, and otherwise.

"Processor" herein refers to one or more known and/or later developed hardware processors and/or processor systems configured to execute one or more computer instructions, with respect to one or more instances of computer data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, microcontrollers; and the like. Processors may be implemented in single or parallel or other implementation structures, including distributed, Cloud based, and otherwise.

"Security Component/Security" herein refers to any known or later arising components, processors, computer instructions, modules, and/or combinations thereof configured to secure data as communicated, processed, stored, output for presentation to a user, or otherwise manipulated. Non-limiting examples of security components include those which implement encryption/decryption standards, such as an Advanced Encryption Standard (AET), and transport security standards, such as Transport Layer Security (TLS) or Secure Sockets Layer (SSL).

"Server" herein refers to one or more devices that include computer hardware and/or computer instructions that provide functionality to one or more other programs or devices (collectively, "clients"). Non-limiting examples of servers include database servers, file servers, application servers, web servers, communications servers, virtual servers, computing servers, and the like. Servers may be combined into clusters (e.g., a server farm), logically or geographically grouped, or otherwise. Any known or later arising technologies may be used for a server.

A server may instantiate one or more computer engines as one or more threads operating on a computing system having a multiple threaded operating system, such as the WINDOWS, LINUX, APPLE OS, ANDROID, and other operating systems, as an application program on a given device, as a web service, as a combination of the foregoing, or otherwise. An Application Program Interface (API) may be used to support an implementation of the present disclosure. A server may be provided in the virtual domain and/or in the physical domain. A server may be associated with a human user, a machine process executing on one or more computing devices, an API, a web service, instantiated on the Cloud, distributed across multiple computing devices, or otherwise. A server may be any electronic device configurable to communicate data using a network, directly or indirectly, to another device, to another server, or otherwise.

"Set Top Box" (STB) herein refers to one or more devices, servers, data stores, communications interfaces, and related components which, singularly and/or cooperatively, facilitate one or more content abridgement functions. As used herein, an "STB function" (STBF) is one or more data processing and/or communications operations performed by one or more STBs, which facilitate one or more content abridgement functions. An STB may include one or more processors, data stores, communications interfaces, user interfaces, busses, and related components. The STB components may be physically, logically, virtually or otherwise grouped and/or coupled to facilitate the one or more content abridgement functions including, but not limited to, those identified herein.

"Substantially simultaneous(ly)" herein refers to an absence of a greater than expected and humanly perceptible delay between a first event or condition and a second event or condition. Substantial simultaneity may vary in a range of quickest to slowest expected delay, to a moderate delay, or to a longer delay. For at least one implementation, substantial simultaneity occurs within an acceptable delay (as described above).

"Trick-play operation" refers to an operation performed alone and/or in combination by a user device and/or an STB and by which a given presentation of a given content may be started, stopped, paused, reversed, fast reversed, forwarded, fast forwarded, skipped, or otherwise manipulated by a user providing user inputs to a given user device. Such user inputs may be provided to the given user device by use of a user interface (as defined below).

"User" herein refers to one or more of a single person, a household of people (such as those in a family), a collection of people (e.g., those in a fraternal organization or a club), or any other association of one or more human beings. A given household may have multiple users and/or collections of users (e.g., parents being one collection of users with children being a second collection of users in a household).

"User Device" herein refers to a device configured for use by a user to communicate, generate, compute, present, process, store, or otherwise manipulate data and/or information. Non-limiting examples of user devices include smartphones, laptop computers, tablet computing devices, desktop computers, smart televisions, smart glasses, virtual reality glasses, augmented reality glasses, earbuds/headphones and other audible output devices, and other devices.

"User Interface" herein refers to one more components, provided with or coupled to a device configured to receive information from and/or present information to a user and convert information to data and vice versa. A user interface may include one more Additional I/O interfaces, Audio I/O interfaces, and Visual I/O interfaces.

"Visual I/O interface" herein refers to one or more components, provided with or coupled to a device, configured to support a receiving and/or presenting of humanly perceptible visual content to one or more users. A visual I/O interface may be configured to support the receiving and presenting of visual content (which is also referred to herein as being "visible signals") to users. Such visible signals may be in any form, such as still images, motion images, augmented reality images, virtual reality images, and otherwise. A visual I/O interface includes hardware and computer instructions (herein, "visible technologies") which supports the input by and output of visible signals to users via a device. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual I/O interface may be configured to use one or more display devices, such as an internal display and/or external display for a given device with the display(s) being configured to present visible signals to a user. A visual I/O interface may be configured to use one or more image capture devices to capture content. Non-limiting examples of image capture devices include lenses, cameras, digital image capture and processing software, and the like. Accordingly, it is to be appreciated that any existing or future arising visual I/O interfaces, devices, systems and/or components may be utilized by and/or in conjunction with a device to facilitate the capture, communication and/or presentation of visible signals to a user.

Content Abridgement System 100

As shown in FIG. 1 and for at least one implementation of the present disclosure, a Content Abridgement System ("CAS") system 100, may include: a user device 102, executing a content activity monitoring application 204; an STB 110, executing an abridgement engine 304, a user preference engine 306, and a content search engine 308; a content server 120; at least one content source 140; and at least one neural network 142. CAS 100 components may be communicatively coupled by one or more couplings 130. A wide area networks, or other communications network (e.g., the Internet 150), may be used to couple components of the CAS 100. One or more of the at least one neural network 142 may be coupled to one or more of the user device 102 and the STB 110 directly or indirectly, by one or more couplings 130 and/or via the Internet 150.

For at least one implementation, the features and functions of the user device 102 and STB 110 may be combined virtually, logically and/or physically such that one of the user device 102 and/or the STB 110 may be configured to instantiate one or more of the content activity monitoring application 204, the abridgement engine 304, user preference engine 306 and the content search engine 308.

User Device 102

Figure 2:
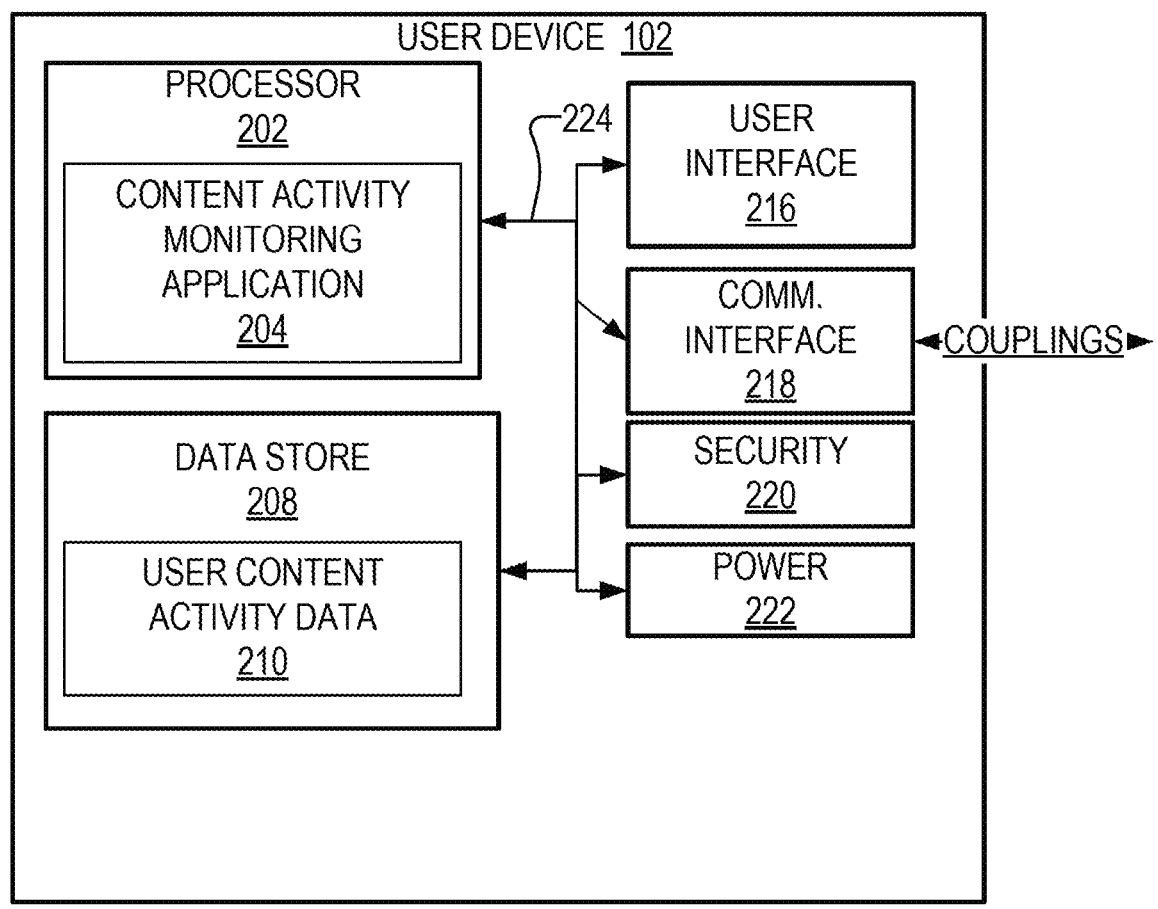
FIG. 2 is a schematic illustration of a user device configured for use in the content abridgement system of FIG. 1 and in accordance with at least one implementation of the present disclosure.

As further shown in FIG. 2 and for at least one implementation, a user device 102 may include one or more device components including, but not limited to, a user device processor 202, a user device data store 208, a user interface 216, a communications interface 218, a security component 220, a power component 222, a bus 224, and other components. The one or more components may be provided with the user device 102 or elsewhere; e.g., a remote data store accessible to the user device 102 by one or more couplings may be used in at least one implementation. The user device processor 202 may be configured to execute one or more computer instructions which, when executed, instantiate one or more applications, such as a content-activity monitoring application 204.

For at least one implementation, the content-activity monitoring application 204 may be configured to interface with other applications executing on a given user device, such as email, text messaging, chat, social media, content presentation applications, and the like.

Content Activity Monitoring Application 204

The user device processor 202 may be configured to execute non-transient computer instructions which instantiate a content activity monitoring application ("CAMA") 204. The computer instructions for the CAMA 204 may be stored in the data store, provided on the Cloud, or otherwise accessible by the user device 102. For at least one implementation, the CAMA 204 may be configured to interface with the STB 110, and perform content monitoring operations.

Content Monitoring Operations: For at least one implementation, content monitoring operations performed by the CAMA 204 may include monitoring activity by a given user with respect to at least one instance of content. Such activities occur and are monitored based on user inputs received by user the user interface(s) 216 from the user. Such user inputs may be provided, by the user to the user device 102, using any known or later arising user interface (as defined herein). Non-limiting examples of such user inputs include content selections, content saving operations, trick-play operations, commenting on content, and/or other actions by a given user with respect to a current consumption of a given instance of content and/or with respect to past consumptions, by the given user, of two or more instances of content (herein, such user inputs are individually and collectively referred to as "user content activities"). The content monitoring operations result in the CAMA 204 generating user content activity data 210 that may be stored in the user device data store 208 and provided to the STB 110 for further analysis and processing.

For at least one implementation, the monitoring of the given user with respect to a given instance of currently presented and/or previously presented content, e.g., an episode of a television program, includes monitoring user content activities that correspond to the given instance of content. For at least one implementation, the content monitoring operations executed by the CAMA 204 may include, for example, identifying whether the given user initiates one or more trick-play operations with respect to one or more portions of the given content then being presented. Such content may be live content or pre-recorded content.

For a non-limiting example, such monitoring may include identifying whether the given user provides an input to the user device 102 that instructs the user device 102 to skip through or otherwise advance at a faster than normal content presentation rate through portions of the given content. The content that is to be skipped through or advanced through may contain and/or present particular forms of content (e.g., scenes depicting violence, sex, nudity, profanity, or the like) that a user desires to not see or otherwise have presented to them (e.g., the user dislikes content of such form, nature, genre, or otherwise).

For at least one implementation, the CAMA 204 collects and stores identification of user content activities and one or more content characteristics as user content activity data 210. The user content activity data 210 is provided, by the user device 102 to the STB 110, on a given basis, such as continually, periodically, on demand, on a scheduled basis, as instructed by the user device 102 or the STB 110, or otherwise.

For at least one implementation, monitoring of the given user with respect to "numerous" (as defined below) instances of content may include monitoring user activities that correspond to one or more, if not each, of the given instances of content, portions thereof, or based on one or more content characteristics of the content. Such content characteristics may be provided from any source, such as meta data associated with the given content, and/or determined using known and/or later developed AI/ML processes including, but not limited to, facial recognition, scene/location recognition, voice recognition, transcript analysis, textual recognition, or the like. AI/ML processes may be further executed by one or more of the user device 102, the STB 110 and/or using a neural network 142 to identify relationships between the determined identifying characteristics in the given content and in view of past determined identifying characteristics in multiple past instances of content to identify one or more user preferences.

For at least one implementation, AI/ML processes may be executed to identify one or more emotive aspects of one or more portions of the given content. The AI/ML processes may be executed in view of one or more characteristics of the given content, such as sounds, images, transcripts or the like. For example, a given content providing humor may include artists laughing which visually may include changes of facial expression, audibly may include laughter sound patterns, and textually (as maintained e.g., in a closed caption transcript) may include indications of "[Laughter]" or the like). The AI/ML processes may accordingly characterize the given portion of the given content and preceding and following portions as having a content characteristic of comedy or humor. The AI/ML processes may further characterize such portions based on sub-categories of comedy, such as physical comedy, adult comedy, satirical comedy, slapstick comedy, or the like.

For at least one implementation, the CAMA 204 may perform multiple content monitoring operations with respect to multiple instances of content, generate based on such monitoring multiple instances of user content activity data 210, and output such multiple instances of user content activity data 210 to the STB 110 for further processing.

For at least one implementation, the CAMA 204 may collect and output to the STB 110 user content activity data 210 based on identification of the given user's content viewing habits as determined based on multiple instances of viewing a given content, multiple instances of viewing a given classification of content, multiple instances of viewing one or more genres of content, or otherwise. Associations and/or relationships between multiples instances of content and/or portions thereof may be determined using AI/ML processes, which may be executed in whole or in part by the user device 102, STB 110, on the Cloud, and/or using one or more neural networks.

For at least one implementation, the CAMA 204 may collect user feedback based on presentations of content (or portions thereof) to the given user. Such user feedback may be output with the user content activity data 210 the STB 110 for further analysis and refinement of content (or portions thereof) to be later presented to the given user.

Figure 4:
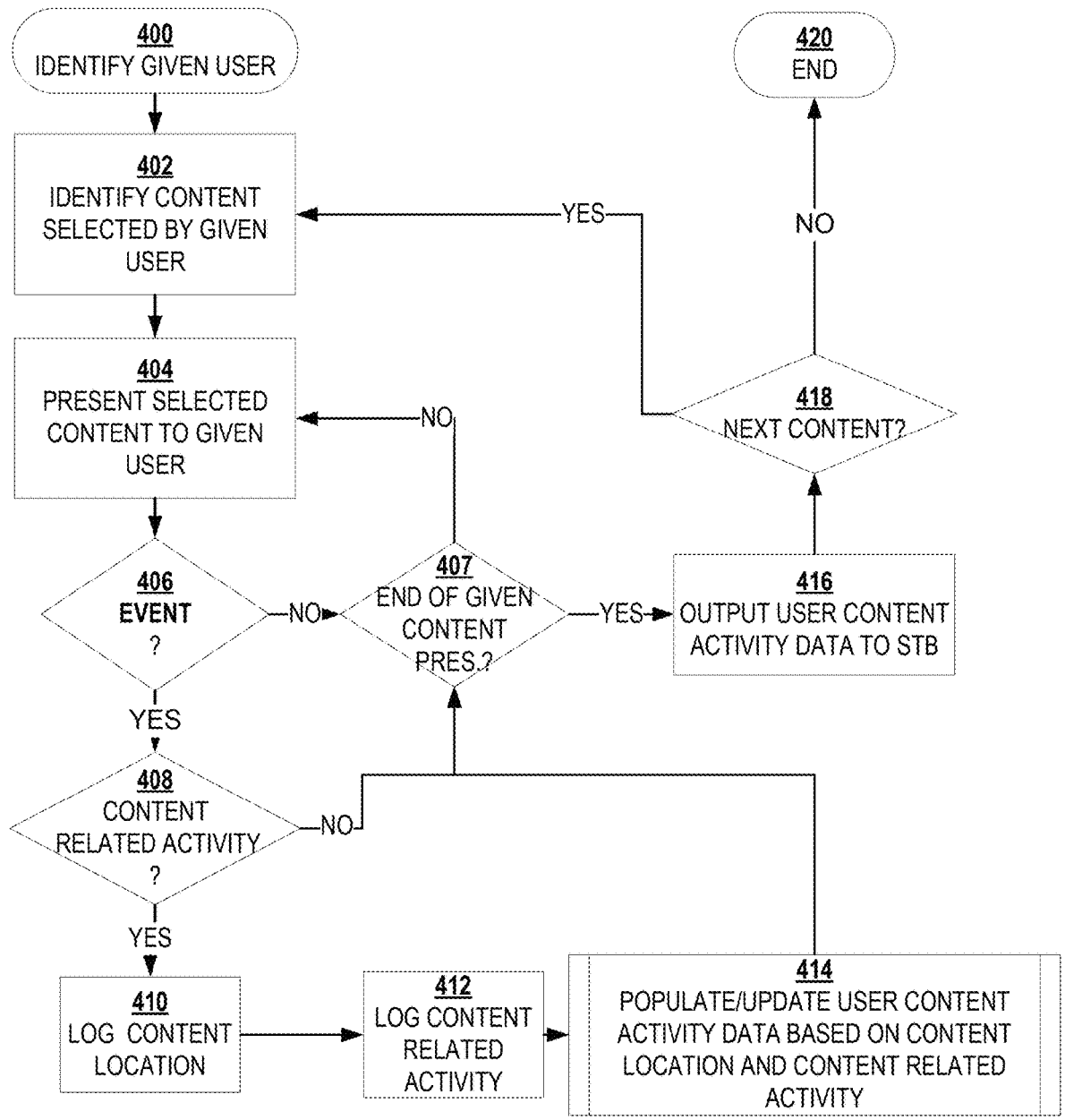
FIG. 4 is a flow chart illustrating a process for capturing user content activity data and user content preferences by a processor in a user device configured for use in a content abridgement system and in accordance with at least one implementation of the present disclosure.

As shown in FIG. 4 and for at least one implementation, a process executed by the CAMA 204 for generated user content activity data 210 may include one or more of the following operations.

As per Operation 400, the process includes identifying the given user. Such identification may occur based upon one or more instances of data that associates a given user with the user device 102. Such association may exist at any given time including multiple given times. For example, a user device 102 configured as a mobile phone (or other device) may include a user identifier that is always associated with the user device 102 (e.g., Bob's phone, Mary's phone, or the like). For another example, a STB 110 may be associated at a given time with a given location, a given subscriber, a given sign-on, or otherwise. Such location, subscriber, sign-on or the like may vary over time. The user of the given user device 102 may vary over time, e.g., with a parent using the user device 102 at one time while a child uses the user device 102 at another time. Any known or later arising process and/or devices for identifying the given user, as the user of a given user device 102 via which one or more user content activity data 210 is to be collected at a given time may be used. The process may proceed to Operation 402.

As per Operation 402, the process includes identifying a given content selected for presentation to the given user at the given time. As used herein, "given content" refers to content selected by a user and "selected content" refers to content selected for presentation to a user by the CAS 100. The given content may be received from any content source including content stored on the user device 102, STB 110, provided by a content source 140, or otherwise. The selection, retrieval, presentation, facilitation of one or more trick-play modes of operation, with respect to the given content may occur using other applications and/or engines provided by the user device 102, the STB 110, or other CAS 100 component individually and/or collectively. Such applications and/or engines are well known in the art and any currently available and/or future arising application and/or engine which facilitates the selection, retrieval and presentation of the given content (e.g., via downloading, broadcast, streaming or the like), and the application or use of one or more trick-play modes of operation, or the like with respect to the given content may be utilized in an implementation of the present disclosure. The process may proceed to Operation 404.

As per Operation 404, the process includes presenting the given content to the given user. Any known or later arising devices, systems and processes may be used to present the given content to the given user. The process may proceed to Operation 406.

As per Operation 406, the process includes detecting an "event" during the presenting of the given content to the given user. As used herein, "event" refers to an instance at which presentation of the given content changes, such as by initiation of a trick-play operation by the given user, the given content reaching an end, or otherwise. If an event is not detected, the process proceeds to Operation 407. If an event is detected, the process proceeds to Operation 408.

As per Operation 407, the process may include determining if the given content presentation has ended. If "yes," the process proceeds to Operation 416. If "no," the process proceeds to Operation 404.

As per Operation 408, the process may include determining if the detected event is or is not a content related activity. For at least one implementation, an event is categorized by the CAMA 204 as being a content related activity when the event includes an initiation of a trick-play operation and other interrupts are not concurrently being presented to the given user. The CAMA 204 further categorize and event as a content related activity when a user input is provided that is directed to one or more given portions of the given content, such as the user marking a given portion of the given content, the user initiating a chat message or the like discussing the given portion of the given content, or the like.

For at least one implementation, an event is not categorized by the CAMA 204 as a content related activity when a trick-play mode of operation is initiated, and an interrupt is being substantially simultaneously presented and/or received by the user device 102 or another electronic device coupled to the user device 102. For example, a user pausing presentation of the given content to accept a telephone call (an example of an "interrupt") may be categorized by the CAMA 204 as not being a content related activity. For another example, a user pausing presentation of the given content (an "event") to answer a doorbell (an "interrupt") is another example of when the CAMA 204 may not categorize the event as being a content related activity.

For at least one implementation, AI/ML processes may be used to refine data processing models which determine whether a given event is to be categorized by the CAMA 204 as being a content related activity or a non-content related activity. It is to be appreciated that the improper categorization of one or more events may result in errors in models used to generate user content relationship data 314 (as described further herein) and to generate user preference data 316 (as described further herein). Such errors may be minimized in weight and/or importance as the data set of event and identification of content related activities/non-content related activities is expanded and further populated with respect to a given user, across a population of users, and otherwise.

For at least one implementation, the CAMA 204 may be configured to detect one or more interrupts during the presentation of the given content. For example, the receipt of the telephone call by the user device 102, or another electronic device coupled to or within range of the user device 102, which results in an initiation of a trick-play operation by the user, such as a "pause" of the presentation of the given content, may be identified by the CAMA 204 as an interrupt and not a content related activity. Likewise, a rewinding of the given content by use of a trick-play operation that occurs following an interrupt (which corresponded, e.g., to a "pause" operation) may be considered to not be a content related activity. Accordingly, for at least one implementation, the CAMA 204 may be integrated with multiple operations and/or engines provided by a given user device 102 or within a given content presentation environment to detect interrupts.

When an event is not a content related activity, the process proceeds to Operation 407. When an event is a content related activity, the process may proceed to Operation 410.

As per Operation 410, the process includes logging or otherwise identifying for future reference and/or use, a location in the given content being presented when the content related activity was detected by the CAMA 204 (per Operation 408). The CAMA 204 may log the location in the given content with respect to which the content related activity occurred using any known or later arising reference system, such as Greenwich Mean Time (GMT), Motion Pictures Experts Group (MPEG) Presentation Time stamps, frame identifier, packet identifier, elapsed presentation time, or other point of reference. The point of reference utilized may vary by content, user device, or otherwise and can be used, recreated and/or restored by the STB 110 to identify content that may be relevant to determining one or more user content relationships, user preferences, or the like.

For at least one implementation, the location at which a given user's input results in detection of a content related activity may occur after a portion of a given content has already been presented. Accordingly, and for at least one implementation, the CAMA 204 is configured to generate "activity log period" which designates a period of time preceding receipt of the user content activity and/or thereafter and identifies content characteristics for those one or more content portions occurring during the activity log period. The process may proceed to Operation 412.

As per Operation 412, the process includes the CAMA 204 logging or otherwise identifying for future reference and/or use, the content related activity. For at least one implementation, a type of trick-play operation corresponding to a given content related activity and a given content portion may be logged. For a first non-limiting example, a content related activity may include a "pause" operation-which may be indicative that the given user desires to further inspect, receive more information regarding, or otherwise has an interest in a given portion of the given content, an artist therein, or the like. For another non-limiting example, a content related activity may include a "fast forward" operation-which may indicative that the given user is not interested in and/or desires to not be presented with content having one or more characteristics, such as violence, sexual nature, or the like. The process may proceed to Operation 414.

As per Operation 414, the process includes populating (and/or updating) the user content activity data 210 stored in the user device data store 208. The user content activity data 210 stored in the user device data store 208 may include one or more of data providing: the event type, whether any interrupts were detected, the location in the given content with respect to which the content related activity was detected, (as logged per Operation 410), one or more content characteristics for the given content portion presented when an event is detected, the content related activity (as logged per Operation 412), and other data which facilitates determinations, by the STB 110, of one or more user content relationships and/or user preferences. The process may proceed to Operation 407.

As per Operation 416, the process includes outputting the user content activity data 210 to the STB 110. The outputting of user content activity data 210 may occur at any time, on any basis or otherwise. The process may proceed to Operation 418.

As per Operation 418, the process may include determining whether a next content is to be presented to the given user and, if so, whether such next content, if any, is to be used to further populate the user content activity data 210. For at least one implementation, the CAMA 204 determines whether a next content is to be used to further populate the user content activity data 210 based on one or more characteristics of the next content (e.g., as represented by metadata associated with the next content), one or more user or user device 102 settings specifying which types of content are to be used and not used to populate the user content activity data 210, and the like. If "yes," the process proceeds to Operation 402. If "no," the process proceeds to Operation 420.

Set Top Box (STB) 110

Figure 3:
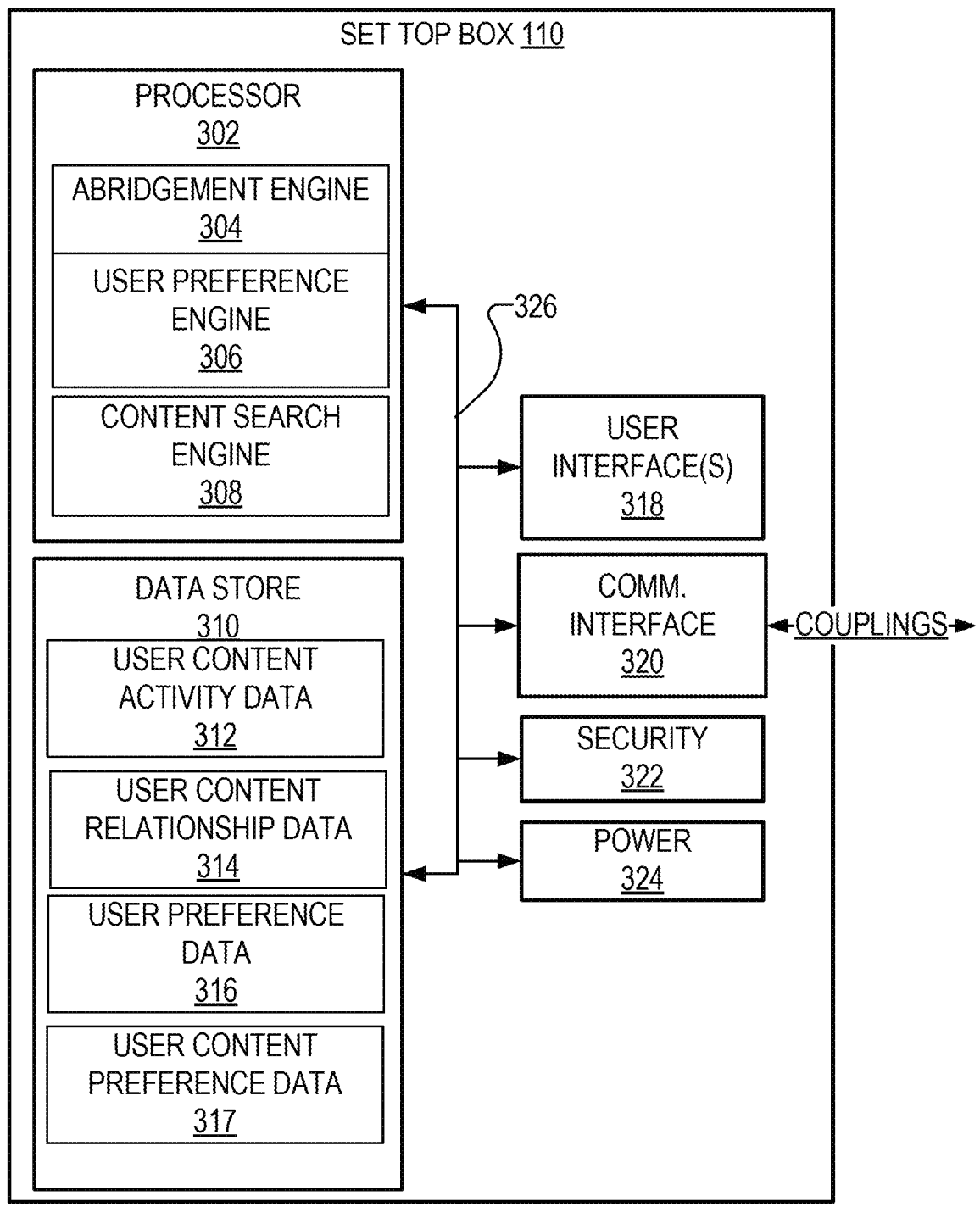
FIG. 3 is a schematic illustration of a set-top-box configured for use in the content abridgement system of FIG. 1 and in accordance with at least one implementation of the present disclosure.

As further shown in FIG. 3 and for at least one implementation, the CAS 100 may include one or more STBs 110. An STB 110 may include one or more device components including, but not limited to, a STB processor 302, a STB data store 310, a user interface 318, a communications interface 320, a security component 3220, a power component 324, a bus 326, and other components. The one or more components may be provided with the STB 110 or elsewhere; e.g., a remote data store accessible to the STB 110 by one or more couplings may be used in at least one implementation.

Abridgement Engine 304

The STB processor 302 may be configured to execute non-transient computer instructions which, when executed, instantiate an abridgement engine 304. The computer instructions for the abridgement engine 304 may be stored in the STB data store 310, provided on the Cloud, or otherwise accessible by the STB 110.

The abridgement engine 304 may be configured to analyze user content activity data 312, as provided by a user device 102 and stored in the STB data store 310, to identify one or more content characteristics in a given content, content characteristics arising across multiple instances of content, and using AI/ML processes identify one or more relationships between the content characteristics and the one or more user content activities generated by the CAMA 204 and stored as user content activity data 312 in the STB data store 310.

For at least one implementation, the one or more content characteristics corresponding to one more user content activities may be provided, to the abridgement engine 304, by a CAMA 204 instantiated on a given user device 102.

For at least one implementation, the one or more content characteristics may be generated by the STB 110 using one or more AI/ML processes, as applied to a given portion of a given content with respect to which a user content activity has been detected by a given user device 102 then presenting the given content to the given user.

For at least one implementation, the abridgement engine 304 analyzes one or more of how, when, where, for how long, or otherwise that a user performs one or more user content activities relative to singular instance of a portion of the given content, singular instances of portions of other content, and multiple instances of multiple portions of the given content and other content. The abridgement engine 304 may further apply such analysis using AI/ML and, for at least one implementation, at least one neural network 142. The abridgement engine 304 may apply such analysis in view of multiple instances of content that the user has previously been presented and one or more instances of user content activity data 312 associated therewith. Using iterative analysis and other known and/or later arising AI/ML data analysis processes, the abridgement engine 304 may generate one or more instances of user content relationship data 314.

For at least one implementation, the abridgement engine 304 may be configured to identify relationships in a then presented content with relationships arising with respect to content and related user content activities thereto that have already occurred. AI/ML analysis may be performed, using a neural network 142 or other processors or collections of processors, across multiple instances of content with respect to which the user has previously initiated one or more user content activities. For example, artists, scenes, locations, storyline, plot, actions, and/or other aspects of the given content that are present when, e.g., a trick-play operation is initiated may be identified as also having been present in multiple instances of content with respect to which past user content activities have occurred. Relationships between the given user and one or more aspects of multiple instances of content may be captured as one or more instances of user content relationship data 314.

For example, a given user replaying scenes depicting a given artist, in a given content and as detected as being present in multiple instances of content, may result in the identification of the given artist as being relevant to the given user and captured as user content relationship data 314. A user preference for the artist by the given user may be generated therefrom, using a user preference engine 306 instantiated by the STB processor 302, as described further herein.

For at least one implementation, the abridgement engine 304 may be configured with one or more initial models that can be applied to the content viewing habits of any user. The initial model may be generated based on one or more demographics of the user (e.g., the user lives in the vicinity of Team Y). The one or more initial models may be further defined, using e.g., AI/ML processes and based on content viewing habits of the user, as generated by the CAMA 204 and stored as user content activity data 312. For example, when the user typically watches football games played by Team Y, a model directed to capturing user content activities and content characteristics of NFL content and Team Y content may be utilized.

The one or more initial models may be further defined based on user content activity data generated while the user, or similar users, watch one or more instances of a given form or genre of content, e.g., NFL game. Such initial model(s) may be refined based on "numerous" subsequent observations of the given user's, and other similarly demographically classifiable users,' user content activities, as reflected in the user content activity data 210 collected by the CAMA 204 and stored as user content activity data 312. Refinements of the initial model(s) may be generated using AI/ML processes until a user specific and operative model of a given user content viewing habit is generated by the abridgement engine.

Herein, "numerous" refers to at least two or more instance of a user viewing and/or otherwise being presented with a given type of content, where the given content has at least one quantifiable content characteristic, and within a given period. For at least one implementation, the AI/ML processes may be applied to ten (10) or more instances of user content activity data, user preference data 316, user content preference data 317, and/or other data. The AI/ML processes may specify the "given period" as being one period (e.g., over a period of a given NFL season), numerous periods (e.g., over multiple NFL seasons), portions of a period (e.g., a period encompassing NFL playoffs or the like), or otherwise. The abridgement engine 304 may utilize AI/ML and different given periods to determine a content viewing habits for a given user based on one or more content characteristics, one or more user characteristics, and the like. For example, the abridgement engine 304 may be configured to determine that a given user has watched, over the last "N" seasons, numerous KANSAS CITY CHIEFS® football matches and based thereon identify a "content viewing habit," for that user of CHIEFS football contests.

As used herein, a "user content viewing habit" refers to how a given user typically engages with content and/or one or more aspects of content as determined based on and numerous instances of user content activities corresponding with numerous instances of given content. For example, a user repeatedly skip content having "R" rated content. The content may occur in any humanly perceptible form and may include audibly, visually, haptically and/or other forms of user perceptible content. As specified by a user content viewing habit, the engagement may typically occur in any form. For at least one implementation, a user engagement may typically be active, e.g., the given user actively receive content by initiating one or more trick-play modes of operation. A user engagement may be passive, e.g., the given user passively receives a presentation of content without engagement of trick-play modes of operation or otherwise. It is to be appreciated that a user may have multiple instances of user content viewing habits. Such instances may be quantified by any scheme, such as genre, artist, viewing time, viewing location, viewing device, or otherwise. The user content viewing habits may be stored as user content relationship data 314 and utilized by the user preference engine 306 to generate one or more instance of user content preference data 317.

User Preference Engine 306

The STB processor 302 may be configured to execute non-transient computer instructions which, when executed, instantiate a user preference engine 306. The computer instructions for the user preference engine 306 may be stored in the STB data store 310, provided on the Cloud, or otherwise accessible by the STB 110.

The user preference engine 306 may be configured to analyze user content relationship data 314, identify one or more user preferences for the given user, which may be stored as user preference data 316 in the STB data store 310, and generate one or more instance of user content preference data 317. The STB 110 may use AI/ML processes, and as needed at least one neural network 142, to further identify one or more user content preferences that exist with respect to the given content, characteristics thereof, and with respect to multiple instances of content, and characteristics thereof.

The user content preference data 317 may be stored in the STB data store 310 and provided to and utilized by a content search engine 308, instantiated by the STB 110 (described further herein), to identify past, present and future instances of content to present to the user in a condensed content data set. Herein, a past instance of content is one which the given user has previously consumed, a present instance is content the given user is currently consuming, and a future instance of content is one that the user has not previously consumed and is not currently consuming.

User Preferencing Operations:

For at least one implementation, user preferencing operations may include determining, based on at least one result obtained from the user content relationship data, one or more user preferences with respect to the given content and/or with respect to other content. For at least one implementation, a user preference may be based, in whole or in part, on one or more of user content activity data 312, user content relationship data 314, a user content viewing habit, and an existing user preference. The user preferencing operations may be executed in view of one or more user demographics. The user demographics may be based on user provided data and/or other data. The user preference engine 306 may be further configured to utilize AI/ML processes to further determine user preferences for content based upon user characteristics and/or other content characteristics. The user preferences may be stored as user content preference data 317 in the STB data store 310.

For at least one implementation, user preference data 316 and/or user content preference data 317 may be further populated based on user inputs. For example, a user watching a given sporting event may indicate, using, e.g., a remote control device, a user content preference for watching sporting events by a given artist, a team, an organization, or the like. For example, a user may enjoy watching CHIEFS football matches and may instruct, via their user device 102, the STB 110 or another device to record one or more future arising broadcasts, streaming presentations, or the like of CHIEFS football matches. A user content preference may be populated at any given level of granularity. For example, a high level may identify a user's preference for sports, a next layer may indicate a type of sports, e.g., football, a next layer may indicate a given football league, e.g., the NFL®, a next layer may indicate a given NFL teams, e.g., the CHIEFS, a next layer may indicate a given player on the team, e.g., a given Quarterback or the like. A given user may be associated with any number of content preferences and such content preferences may be provided at one or more levels of granularity and such levels of granularity may apply to multiple content characteristics, e.g., a given user being associated with a content preference for both the CHIEFS and the 49ERS NFL teams. The content preferences may further specify a weighting or ranking preference, for the given user, for multiple content preferences that populating a given level of granularity in a hierarchical, relational, or other database structure, such as the given user preferring CHIEFS content over 49ERS content.

Content Search Engine 308

The STB processor 302 may be configured to execute non-transient computer instructions which, when executed, instantiate a content search engine 308. The computer instructions for the content search engine 308 may be stored in the STB data store 310, provided on the Cloud, or otherwise accessible by the STB 110.

The user content preference data 317 may be provided to and utilized by the content search engine 308 to search the one or more content sources 140 for content that corresponds to the user content preference data 317. For at least one implementation, such searching operations may include searching a given instance of content, such as a given episode of a television series, and/or multiple instances of content, such as two or more episodes of the television series.

The user content preference data 317, when used in combination with the content characteristics corresponding to a given content or multiple instances of content may be further utilized, by the content search engine 308 to generate a condensed version of the given content or the multiple instances of content, wherein in the condensed version those portions of the content which correspond to a user content preference, as represented by the user content preference data 317, are presented to the given user, when the condensed version is provided to the user device.

For a non-limiting example, a given content may include an NFL® football game. The user content activities for a given game may include pausing and rewinding catches of the football by a given player. The CAMA 204 may be configured to capture such user content activities and identify one or more content characteristics associated therewith and output user content activity data to the STB 110. Using the user content activity data, the abridgement engine 304 may analyze the data provided and previous instances of the user having initiated a user content activity when an NFL player caught the ball in a previously viewed game to identify one or more relationships between the user and the content. For example, the user may have an affinity to watch Player X of Team Y catch the ball, may have an affinity for Player X regardless of whether he catches a ball (e.g., he is thrown the ball but a pass attempt is not completed), may have an affinity for Player X that transcends the game, the team, the league, or the like, or some other affinity or form of user preference that corresponds to Player X, e.g., Player X's dating relationships or the like. As described above AI/ML process (including the use of neural networks for at least one implementation) may be utilized to generate user content relationship data 314 that identifies the one or more affinities between the given user and Player X (as represented by one more content portions).

The user content relationship data 314 may be further analyzed by the user preference engine 306 to identify user content preferences of the given user with respect to the given content (that include Player X in some form of information). For example, the user content preference data 317 may indicate that the given user may desire to be presented with content regarding Player X (e.g., during football games). The user preference data 316 may indicate how the given user may desire to be so presented with content (e.g., on their smartphone, TV or the like) and the form of content to be presented (e.g., video, audio, social media, news articles that the user can read, or the like). A combination of user preference data 316 and user content preference data 317 may be generated by the user preference engine 306 with respect to the given user and based, at least in part, on the user content relationship data 314. It is to be appreciated that the iterations of such relationships are likely infinite, and the user preference data 316 and user content preference data 317 may be accordingly generated in any number of types, permutation, instances or otherwise.

The user preference data 316 and user content preference data 317 may be utilized by the content search engine 308 to search singular instances of content (e.g., a currently presented NFL game), multiple instances of content, content libraries, and the like available via the Internet 150 from one or more content sources 140 to identify content that the user prefers (e.g., viewing catches by Player X or other information pertaining to Player X). The content search engine may apply the user preference data 316 and the user content preference data 317 to the content available to generate a condensed content set (which may include multiple instances of content portions from a singular content or multiple contents) for presentation to the given user via the user device 102. For example, the content search engine 308 may identify, based on user content preference data 317 instances in a recently completed NFL game in which Player X participated, where Player X caught a pass and instead of presenting the entire NFL game, present, in a condensed content data set, those portions where Player X so caught a pass. The content search engine 308 may further identify based on user preference data 316 how the condensed content data set is to be presented to the given user, for example, as a high-definition program stream, as a 4K program stream, as an audio program stream, or otherwise. It is to be appreciated that for at least one implementation, a user content preference indicates types of content of interest to the given user and a user preference indicates how, when, where or the like the content is to be presented to the given user.

Figure 5:
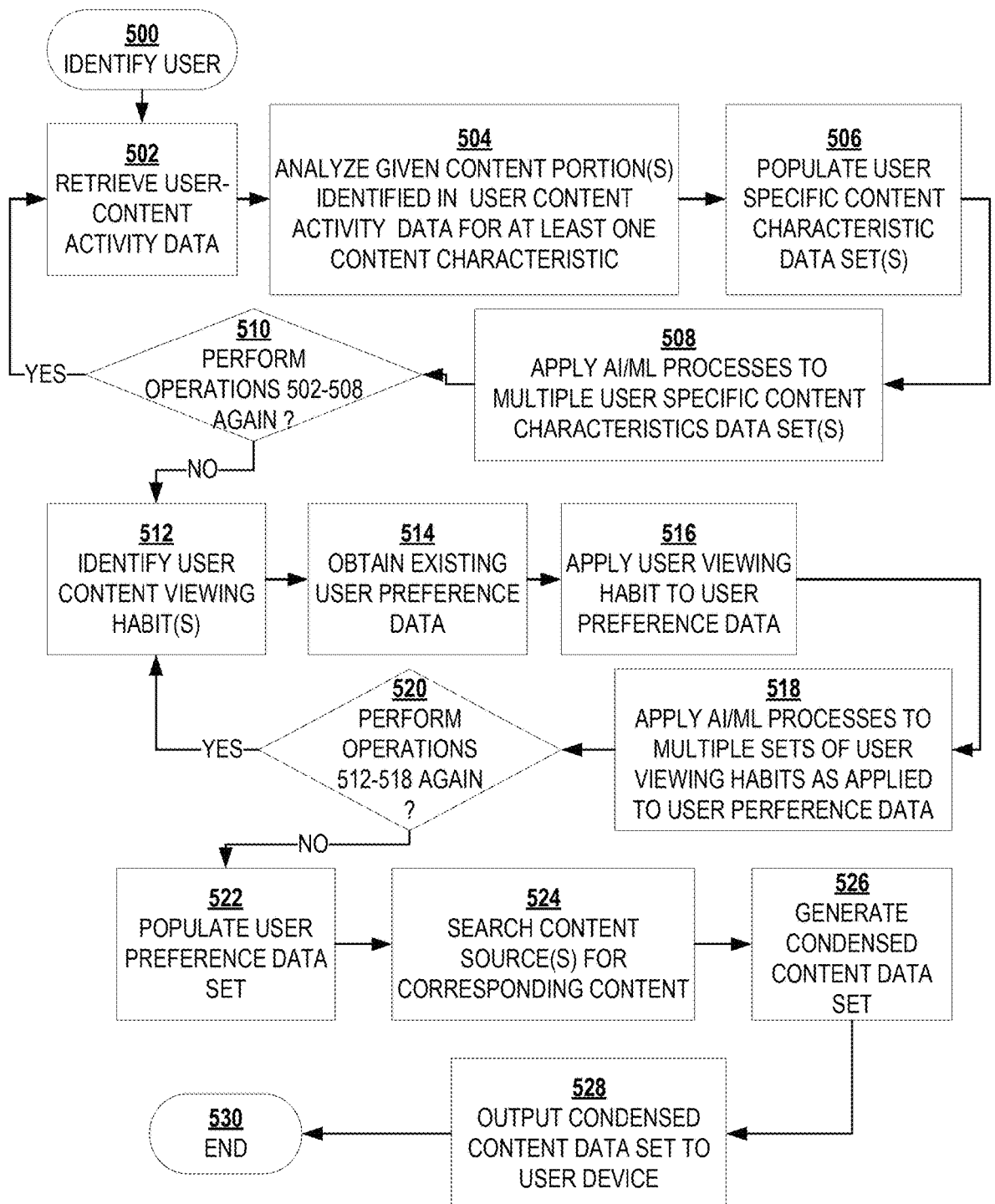
FIG. 5 is a flow chart illustrating a process for identifying content of potential interest to a user, executed by a set top box configured for use in the content abridgement system of FIG. 1 and in accordance with at least one implementation of the present disclosure.

As shown in FIG. 5, a process for generating a condensed content data set based on user content activity data 312 may include execution by the user device processor 202 of one or more non-transient computer instructions which instantiate the abridgement engine 304, user preference engine 306 and content search engine 308 and which performs operations including the following.

As per Operation 500, the process may include identifying the given user with respect to which a condensed content data set is to be generated. Identification of the given user may occur based upon, for example, user input, e.g., providing of a sign-on and password or the like, an association of a given user with a given device—the device being identified to and/or identifiable by the STB 110, or otherwise.

As per Operation 502, the process may include retrieving one or more instances of user content activity data 312 from the STB data store 310. If user content activity data 312 is not available, the process may alternatively include requesting the same from the user device 102 associated with the given user. If user content activity data 312 is not available, a generic user content activity data set may be used with the generic user content activity data set being utilized being selected by the abridgement engine based on an identification of a current content being presented to the given user via the user device 102 and/or a past content presented to the given user.

As per Operation 504, the process may include analyzing one or more given content portions, as identified in first set of the, as stored, user content activity data 312, for one or more content characteristics.

As per Operation 506, the process may include populating one or more user specific content characteristic data sets. It is to be appreciated that, as initially generated and with respect to a given content portion, a user specific content characteristic data set may associate each of the content characteristics arising with respect to the given content portion with the given user. Accordingly, an initial populating of a user specific content characteristic data set may be non-determinative of the given user's content preferences.

As per Operation 508, the process may include applying AI/ML processes to multiple user specific content characteristic data sets.

As per Operation 510, the process may include determining whether to apply Operations 502-508 to an another user content activity data set. It is to be appreciated that with each application of the AI/ML processes to additional user content activity data sets multiple the user to content characteristics data sets may be refined to identify those content characteristics common or otherwise statistically significant to the given user.

If "yes," Operations 502-508 are performed again. It is to be appreciated that the AI/ML processes may be configured to execute for any given amount of time, iterations, permutations, or otherwise of user content viewing habits with user preference data. The quantity of AI/ML processes applied may be limited by one or more of neural network and/or AI/ML processors access time, financial resources, or otherwise. If "no," the process proceeds to Operation 512.

As per Operation 512, the process may include identifying one or more user content viewing habits for the given user.

As per Operation 514, the process may include obtaining, from the STB data store 310, an existing user preference data 316.

As per Operation 516, the process may include applying the user viewing habit(s) to the user preference data 316.

As per Operation 518, the process may include applying AI/ML processes to multiple sets of user view habits, as applied to user preference data, to further define user content preferences.

As per Operation 520, the process may include determining whether to perform Operations 512-518 again and with respect to another combination of user content viewing habit(s) and user preference data. It is to be appreciated that with each application of the AI/ML processes to additional user content viewing habit(s) data sets with user preference data may be refined to identify those content preferences that are statistically significant to the given user.

If "yes," Operations 512-518 are performed again. It is to be appreciated that the AI/ML processes may be configured to execute for any given amount of time, iterations, permutations, or otherwise of user content viewing habits with user preference data. The quantity of AI/ML processes applied may be limited by one or more of neural network and/or AI/ML processors access time, financial resources, or otherwise. If "no," the process proceeds to Operation 522.

As per Operation 522, the process may include populating one or more instances of a user content preference data 317 and storing the same in the STB data store 310.

As per Operation 524, the process may include utilizing, by the content search engine 308, the user content preference data 317 to search one or more content sources for content portions that correspond to the one or more user content preferences stored as user content preference data 317.

As per Operation 526, the process may include generating a condensed content data set. One or more AI/ML processes may be used in generating the condensed content data set to filter content available from multiple content sources as additional content is discovered per Operation 524. It is to be appreciated that Operation 524-526 may be executed on a continual, intermittent, on-demand, or other basis to identify corresponding content from one or more content sources 140 and accordingly continually, intermittently, on-demand, or otherwise generated the condensed content data set.

As per Operation 528, the process may include outputting the condensed content data set to the given user's user device for presentation thereby to the given user. For at least one implementation, the condensed content data set may be streamed to the user device 102 by the STB 110. For another implementation, the condensed content data set may be downloaded to the user device 102 from the STB 110.

As per Operation 530, the process end.

It is to be appreciated that the Operations depicted in FIGS. 4-5 may occur in sequence as shown, and/or in any other sequence of operations including one more operations occurring in parallel.

Although various implementations have been described above with a degree of particularity, or with reference to one or more individual implementations, those skilled in the art could make alterations to the disclosed implementations without departing from the spirit or scope of the present disclosure. The use of the terms "approximately" or "substantially" means that a value of an element has a parameter that is expected to be close to a stated value or position. As is well known in the art, there may be minor variations that prevent the values from being as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "next," "last," "before," "after," and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings be interpreted as illustrative of implementations and not limiting. Changes in detail or structure may be made without departing from the basic elements of the present disclosure as described in the following claims.

What is claimed is:

1. A system comprising:
a user device comprising:
a non-transient user device data store storing first computer instructions, which when executed, instantiate a content-activity monitoring application ("CAMA");
a user interface coupled to a user interface presenting a given content to a given user and receiving user content activity; and
a user device processor coupled to the user device data store and the user interface;
wherein the user device processor, when executing the first computer instructions, instantiates the CAMA, which performs first operations comprising:
monitoring the user interface to detect the user content activity with respect to the given content;
determining a first content portion of the given content that corresponds with the detection of the user content activity;
determining a content characteristic of the first content portion of the given content; and
generating user content activity data that identifies the user content activity and the first content portion of the given content; and
a set top box ("STB"), coupled to the user device, comprising:
a non-transient STB data store storing second computer instructions for an abridgement engine; and
an STB processor coupled to the STB data store;
wherein the STB processor, when executing the second computer instructions, instantiates the abridgement engine which performs second operations comprising:
receiving the user content activity data generated by the CAMA; and
generating user content relationship data based on a correspondence of the user content activity with the content characteristic of the first content portion of the given content; and wherein, based on the user content relationship data, the STB processor generates a condensed content data set for output to the user device and presentation to the given user.

2. The system of claim 1,
wherein the STB data store further store third computer instructions for a user preference engine;
wherein the STB processor, when executing the third computer instructions, instantiates the user preference engine;
wherein the user preference engine performs third operations comprising:
analyzing the user content relationship data to identify one more user content preferences for the given user;
analyzing one or more user preferences stored in the STB data store; and
generating, based on the user content relationship data and the one or more user preferences, user content preference data.

3. The system of claim 2,
wherein the STB data store further stores fourth computer instructions for a content search engine;
wherein the STB processor, when executing the fourth computer instructions, instantiates the content search engine;
wherein the content search engine performs fourth operations comprising:
searching at least one content source for portions of content which correspond to the user content preference data; and
generating, based on results obtained from the searching, the condensed content data set.

4. The system of claim 3,
wherein the user content activity includes a trick-play operation requested by the given user with respect to the first content portion of the given content.

5. The system of claim 3,
wherein the first operations performed by the CAMA further include:
identifying the content characteristic of the first portion of the given content; and
populating the user content activity data with the content characteristic of the first portion of the given content.

6. The system of claim 5,
wherein the content characteristics of the first content is identified based on metadata associated with the given content.

7. The system of claim 5,
wherein the identifying of the content characteristic of the first content further comprises:
executing Artificial Intelligence/Machine Learning ("AI/ML") processes to identify the content characteristic of the first portion of the given content.

8. The system of claim 7,
wherein the AI/ML processes are executed using a neural network coupled to the user device and the AI/ML processes further include:
performing at least one of facial recognition, voice recognition and textual recognition on the first portion of the given content.

9. The system of claim 8,
wherein the first operations further comprise:
further monitoring the user interface to detect a next user content activity with respect to numerous instances of a next given content;

further determining a next content portion of one or more of the numerous instances of the next given content that corresponds with the detection of the next user content activity; and
populating the user content activity data with data that identifies, for the one or more of the numerous instances of the next given content, the next user content activity and the next content portion; and
repeatedly performing the further monitoring, the further determining and the populating with respect to the one or more of the numerous instance of the next given content presented to the given user over one or more given periods.

10. The system of claim 9,
wherein the first operations performed by the CAMA further include, with respect to at least one of the one or more of the numerous instances of the next given content:
further identifying the content characteristic of the first portion of the next given content; and
populating the user content activity data with the content characteristic of the first portion of the next given content.

11. The system of claim 10,
wherein the further identifying of the content characteristic of the next given content, with respect to at least one of the one or more of the numerous instances of the next given content, further comprises:
executing the AI/ML processes to perform at least one of facial recognition, voice recognition and textual recognition on the one or more of the numerous instances of the first portion of the next given content.

12. The system of claim 11,
wherein the second operations are performed by the abridgement engine with respect to the at least one of the one or more numerous instances of the next given content.

13. The system of claim 12,
wherein second AI/ML processes are utilized to refine the user content relationship data based on at least one of numerous correspondences of the one or more numerous instances of next user activity with the at least one or more of the numerous instances of the next given content.

14. The system of claim 13,
wherein the second AI/ML processes are applied to at least ten instances of next user activity that correspond to at least ten instances of the next given content.

15. The system of claim 14,
wherein the second AI/ML processes discern a user content viewing habit; and
wherein the second operations further comprise:
populating the user content preference data based on the user content viewing habit.

16. The system of claim 15,
wherein the fourth operations further comprise:
second searching at least one content source for portions of content which further correspond to user preference data for the given user; and
wherein the user preference data indicates at least of how, when and where a given user prefers to receive content; and
generating, based on results obtained from the searching and second searching, the condensed content data set.

17. A non-transitory computer readable medium, having stored thereon computer instructions which, when executed by a processor of a user device, causes the user device to perform operations comprising:
monitoring a user-to-device interface to detect user content activity with respect to a given content presented to a given user of the user device;
determining a first content portion of the given content that corresponds with the detection of the user content activity;
determining a content characteristic of the first content portion of the given content;
executing at least one Artificial Intelligence/Machine Learning ("AI/ML") process to further identify the content characteristic of the first portion of the given content;
generating user content activity data that identifies the user content activity and the first content portion of the given content;
further monitoring the user interface to detect a next user content activity with respect to numerous instances of a next given content;
further determining a next content portion of one or more of the numerous instances of the next given content that corresponds with the detection of the next user content activity;
populating the user content activity data with data that identifies, for the one or more of the numerous instances of the next given content, the next user content activity and the next content portion; and
performing the further monitoring, the further determining and the populating with respect to the one or more of the numerous instance of the next given content presented to the given user over one or more given periods to generate a user content activity data set; and
providing the user content activity data set to a server; and
wherein, based on the user content activity data set, the server generates and provides a condensed content data set to the user device for presentation to the given user.

18. A non-transitory computer readable medium, having stored thereon computer instructions which, when executed by a processor of a set top box ("STB"), cause the STB to perform operations comprising:
instantiating an abridgement engine which performs operations comprising:
receiving user content activity data generated by a content activity monitoring application instantiated on a user device; and
generating user content relationship data based on a correspondence of the user content activity with a content characteristic of a first content portion of a given content presented to a given user of the user device; and
generating, based on the user content relationship data, a condensed content data set for output to the user device and presentation to the given user.

19. The non-transitory computer readable medium of claim 18,
wherein the operations further comprise:
analyzing the user content relationship data to identify one more user content preferences for the given user;
analyzing one or more user preferences stored in an STB data store; and
generating, based on the user content relationship data and the one or more user preferences, user content preference data for the given user.

20. The non-transitory computer readable medium of claim 19,
wherein the operations further comprise:

searching at least one content source for portions of content which correspond to the user content preference data for the given user; and generating, based on results obtained from the searching, the condensed content data set.

* * * * *